(12) United States Patent
Wallace

(10) Patent No.: US 7,621,497 B2
(45) Date of Patent: Nov. 24, 2009

(54) CEILING MOUNT

(75) Inventor: Patrick Wallace, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 500 days.

(21) Appl. No.: 11/267,006

(22) Filed: Nov. 4, 2006

(65) Prior Publication Data

US 2007/0102613 A1    May 10, 2007

(51) Int. Cl.
    *B42F 13/00* (2006.01)
(52) U.S. Cl. ............ 248/343; 248/317; 248/228.2
(58) Field of Classification Search ............ 248/222.13, 248/222.51, 222.52, 228.2, 340, 317, 343
    See application file for complete search history.

(56) References Cited

U.S. PATENT DOCUMENTS

| 3,018,080 | A  | * | 1/1962 | Loudon ............ 248/228.4 |
| 4,191,352 | A  | * | 3/1980 | Schuplin ............ 248/317 |
| 6,691,827 | B2 | * | 2/2004 | Lycett ............ 182/138 |
| 6,708,939 | B2 | * | 3/2004 | Walker ............ 248/323 |

* cited by examiner

*Primary Examiner*—Gwendolyn Baxter

(57) ABSTRACT

Described is a ceiling mount for a device comprising a channel member and a latch. The channel member includes a side surface extending upward a first predetermined distance from a top surface of a housing of the device and a horizontal surface extending for a second predetermined distance away from the side surface in a direction substantially parallel to the top surface to define a first ceiling member receiving channel between the horizontal surface and the top surface. The latch is rotatably attached to the top surface. The latch defines a second ceiling member receiving channel between the latch and the top surface, so that when rotated, the latch covers the second ceiling member receiving channel.

14 Claims, 6 Drawing Sheets

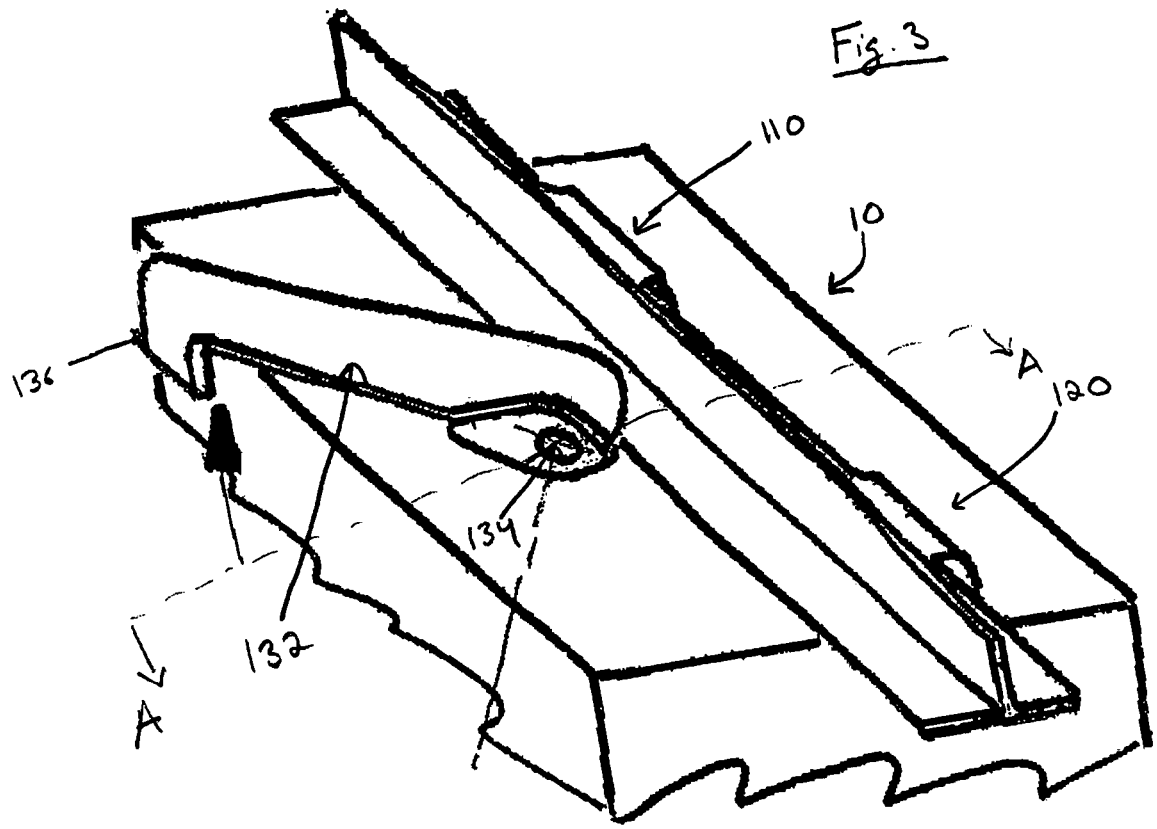
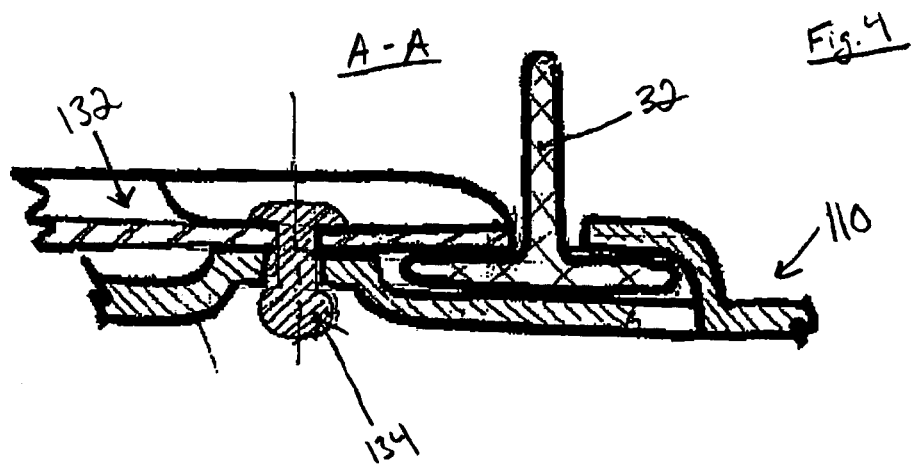

CEILING MOUNT

BACKGROUND

In a typical wireless networking environment, the range of communication between devices is usually limited to at most several hundred feet. Obstructions and interferences such as walls and unwanted radio waves further diminish that range. As a result, wireless mobile units ("MUs") must be within predetermined operating distances of communication devices (e.g., access points, routers, repeaters, etc.) before communication with the network may be established.

In order to provide serviceable signal strength wherever the MU may be, businesses employing wireless networks often position communication devices on walls or ceilings throughout the desired operating area. Currently, the installation of communication devices is an extremely difficult and time consuming process involving removal of tiles, drilling of holes, and use of equipment such as screwdrivers, screws, mounting clips, nuts, washers and spacers. As the size of the network grows (e.g., extended range, more devices, etc.), the costs and time associated with this process increase exponentially.

When the mounted wireless communication device is removed, the uninstallation process may be just as problematic. Moreover, unsightly scratches, cuts, holes and other permanent property damage may be left behind where the device once was, adding additional repair or replacement costs. Therefore, there is a great need to expedite and make more cost-efficient the cumbersome installation and removal of network infrastructure while at the same time avoiding permanent damage to property.

SUMMARY OF THE INVENTION

The present invention relates to a ceiling mount for a device comprising a channel member and a latch. The channel member includes a side surface extending upward a first predetermined distance from a top surface of a housing of the device and a horizontal surface extending for a second predetermined distance away from the side surface in a direction substantially parallel to the top surface to define a first ceiling member receiving channel between the horizontal surface and the top surface. The latch is rotatably attached to the top surface. The latch defines a second ceiling member receiving channel between the latch and the top surface, so that when rotated, the latch covers the second ceiling member receiving channel.

BRIEF DESCRIPTION OF THE DRAWINGS

FIG. 3 shows a perspective view of an exemplary wireless communication device with mounting components according to the present invention.

FIG. 4 shows a partial sectional view of the device of FIG. 3 along the line A-A according to the present invention.

DETAILED DESCRIPTION

Figure 1:
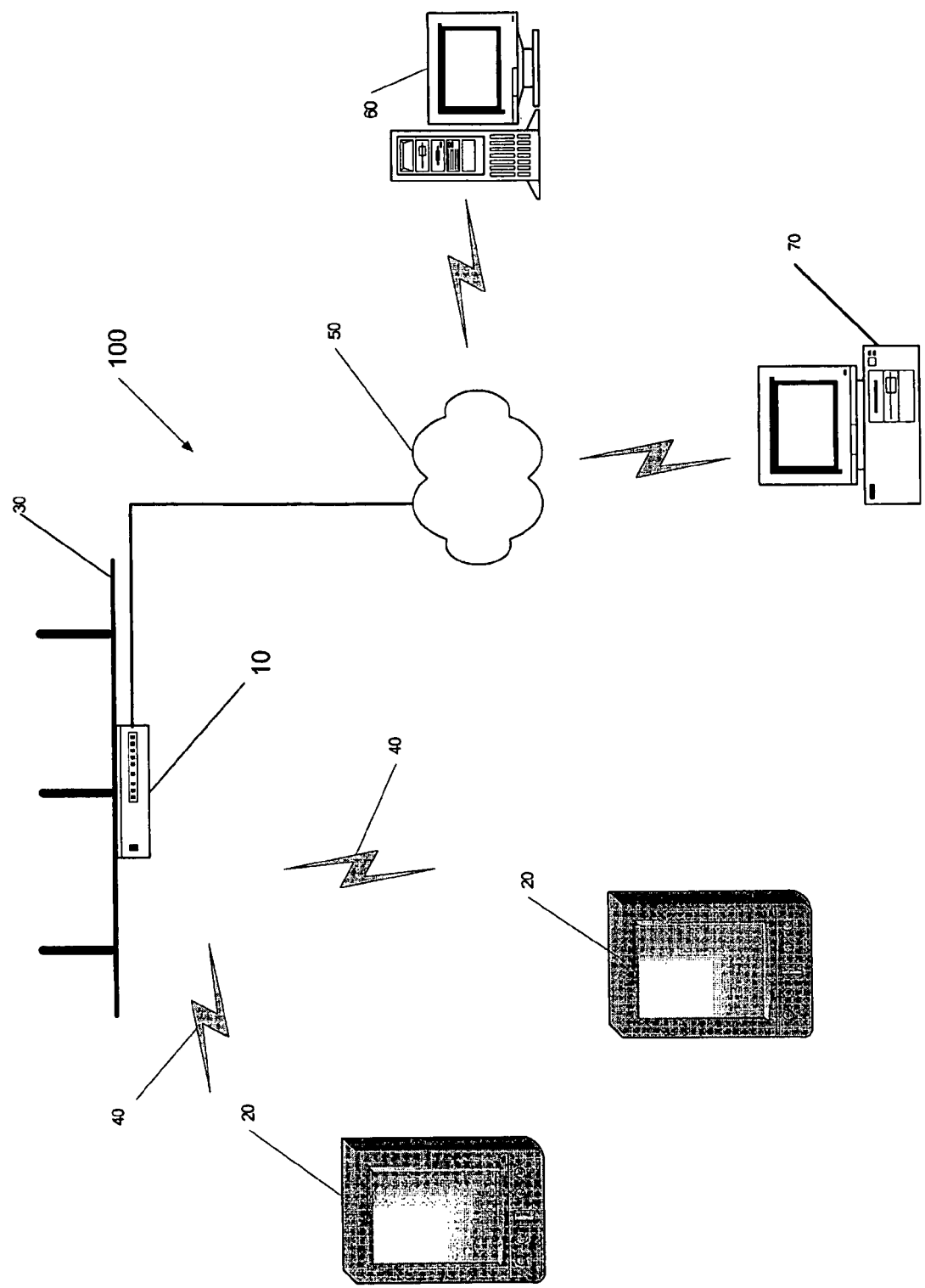
FIG. 1 shows an exemplary embodiment of a wireless network according to the present invention.

The present invention may be further understood with reference to the following description and the appended drawings, wherein like elements are provided with the same reference numerals. The present invention relates to a ceiling mount/attachment (e.g., for a wireless communication device) to be suspended from a T-bar ceiling. No tools or mounting hardware are required, nor is there a need to drill holes, or otherwise make alterations to property. The primary components facilitating attachment are either fully integrated into or detachable from a mounting surface of the device. No scratches, holes, glue, screws, or other residue of any kind are left behind on the ceiling after the device is removed.

Throughout the description a wireless network access point/port ("AP") is utilized as an exemplary wireless communication device to be mounted onto the suspended T-bar ceiling. However, the present invention may be utilized in any type of wireless communication devices (e.g., wireless routers, repeaters, hubs, bridges, etc.). In addition, the components of the present invention may be utilized by any device to be mounted onto a suspended T-bar ceiling (e.g., a smoke detector, a motion sensor, a security device, a video camera, etc.).

FIG. 1 shows an exemplary embodiment of a wireless network 100 according to the present invention. In this embodiment, the wireless network 100 may be operating within a Wireless Local Area Network ("WLAN") 40 in an infrastructure mode. The wireless network 100 includes an AP 10 mounted to a suspended T-bar ceiling 30, a plurality of mobile units ("MU"s) 20, a communications network 50, a server 60, and a client computer 70. Those of skill in the art will understand that the exemplary embodiments of the present invention may be used with any wireless network and that the wireless network 100 is only exemplary.

The WLAN 40 may use a version of the IEEE 802.11 or a similar protocol. One benefit of using a version of the IEEE 802.11 standard is that existing infrastructures using that standard may be adapted to support the system with minimal modifications. With only a simple software upgrade, most MUs supporting that standard may operate according to the present invention. In other exemplary embodiments, a different wireless protocol (e.g., Bluetooth, WPAN, WWAN, infrared, etc.) may be utilized.

Referring back to the wireless network 100, the AP 10 may be, for example, a router, switch, hub or bridge that forms the connection between the WLAN 40 and the communications network 50. Coupled to the WLAN 40 are the MUs 20 and coupled to the communications network 50 are the server 60 and the client computer 70. The communications network 50 may be any network usable to transmit data between the various components of the wireless network 100, such as between microprocessors, and may be, for example, a local area network ("LAN"), a wide area network ("WAN") or an intranet. The AP 10 does not have to physically be in the vicinity of the server 60 or the client computer 70 so long as it is within a communicable range of the MUs 20, as the AP 10 may be remotely located by extending network cabling thereto.

The MUs 20 may be any type of computer or processor based wireless device capable of connecting to a wireless network (e.g., a laser/image-based scanner, an RFID reader/tag, a PDA, a laptop, a two-way pager, a mobile phone, a digital camera, a mobile optical reader, a network interface card, etc.). Since the MUs 20 are portable, they are preferably sufficiently small to be easily carried. The MUs 20 may be designed for specific purposes, such as reading barcodes, or may be handheld devices with different purposes, to which various functionalities have been added through separate software modules. In one embodiment, the MUs 20 are based on a multi-purpose personal digital assistant ("PDA") such as those running the Microsoft Pocket PC 2003 operating system, or similar.

As will be apparent to those skilled in the art, different types of MUs may be used to communicate over the same data network, as long as they work under compatible wireless communication protocols. Other configurations with different numbers and types of MUs, APs, or client and server computers may also be used to implement the system.

Figure 2:
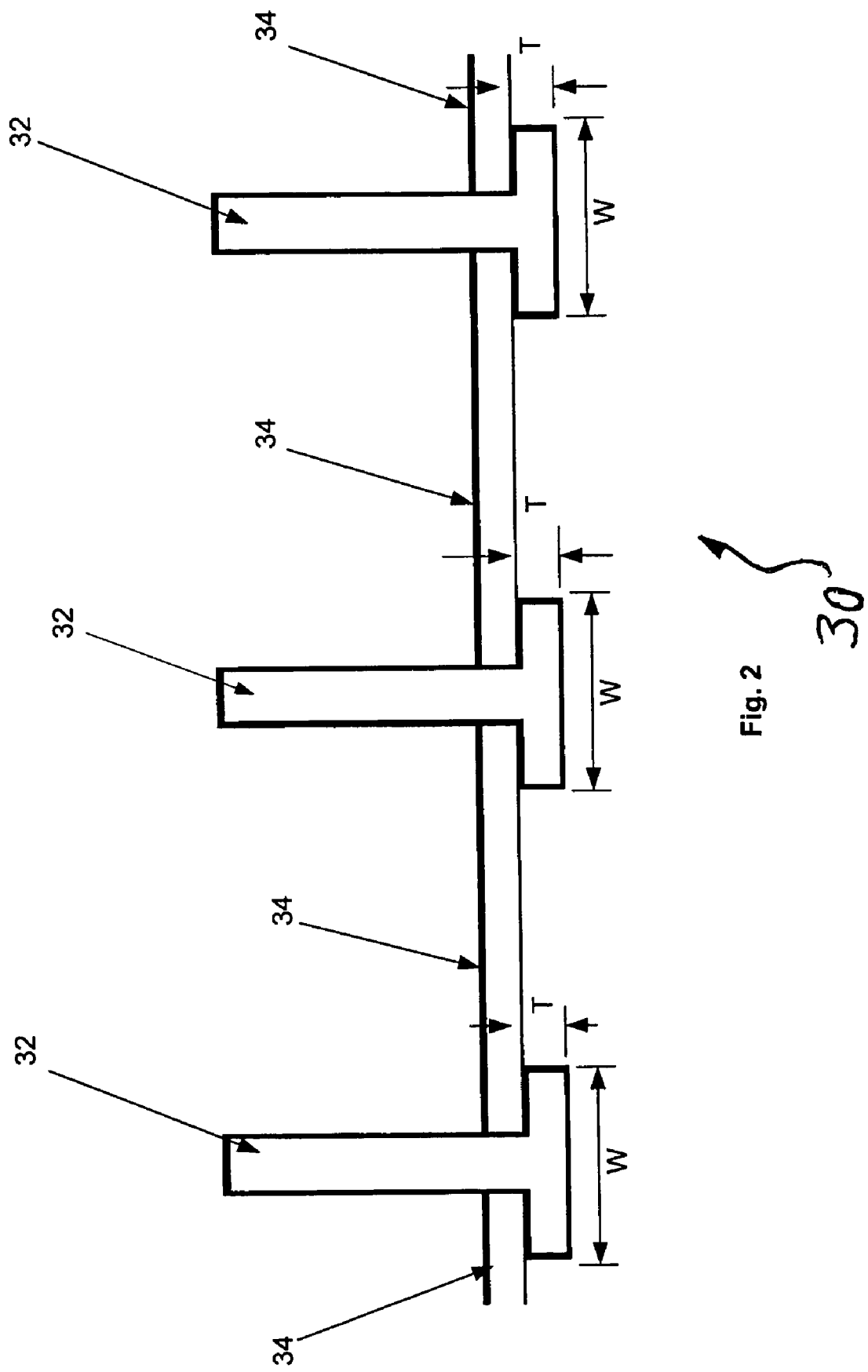
FIG. 2 shows a side view of an exemplary embodiment of a suspended T-bar ceiling according to the present invention.

FIG. 2 shows a side view of an exemplary embodiment of a segment of the suspended T-bar ceiling 30 prior to the attachment of any wireless communication devices thereto. The suspended T-bar ceiling 30 includes a set of substantially parallel, evenly spaced T-bars 32 running substantially perpendicular to another parallel set of evenly spaced T-bars 32, forming a grid upon which the ceiling tiles 34 rest. Horizontal T-bar 32 flanges support the ceiling tiles 34, and are of a predetermined thickness T and a predetermined width W. A stem of each T-bar 32 is affixed at its end opposite the tile flange to the room's permanent ceiling. In order to facilitate the interchangeability of ceiling fixtures (e.g., light fixtures, air conditioning vents, etc.), nearly all suspended T-bar ceiling 30 structural members are of a universal size, shape, and spacing. Thus, the present invention allows for the attachment of wireless communication devices to any T-bar 32 of a suspended ceiling 30 without the need to adjust any of the mounting components.

FIG. 3 shows an exemplary embodiment of the AP 10 with mounting components integrated into a surface thereof. The mounting components include at least one clip (e.g., a rear clip 110 and a front clip 120) and a latch 130. In the exemplary embodiment, the clips are molded as permanent features of the AP 10 (e.g., on a housing/casing) and may be made of any malleable material (e.g., plastic, sheet metal, cast metal, etc.). The latch 130 is preferably rotatably coupled to a pivot 134 molded on the AP 10. Because the clips 110, 120 and the latch 130 are small relative to the AP 10, the use of the device in other mounting configurations (e.g., desk or wall mounting) are not inhibited by these elements.

Each of the clips 110 and 120 includes a first side surface extending upward substantially perpendicular to the mounting surface of the AP 10 for a first predetermined distance at least equal to a thickness T of the T-bar 32. The first side surface then bends toward the stem of the T-bar 32 in a direction substantially parallel to the mounting surface extending a second predetermined distance in this direction approximately less than half of the width W to form a first horizontal surface. The clips 110 and 120 are aligned along a longitudinal axis of the AP 10 and separated from one another by a predetermined distance selected so that a position of the latch 130 lay at any point between the distance (e.g., bisects).

Figure 5:
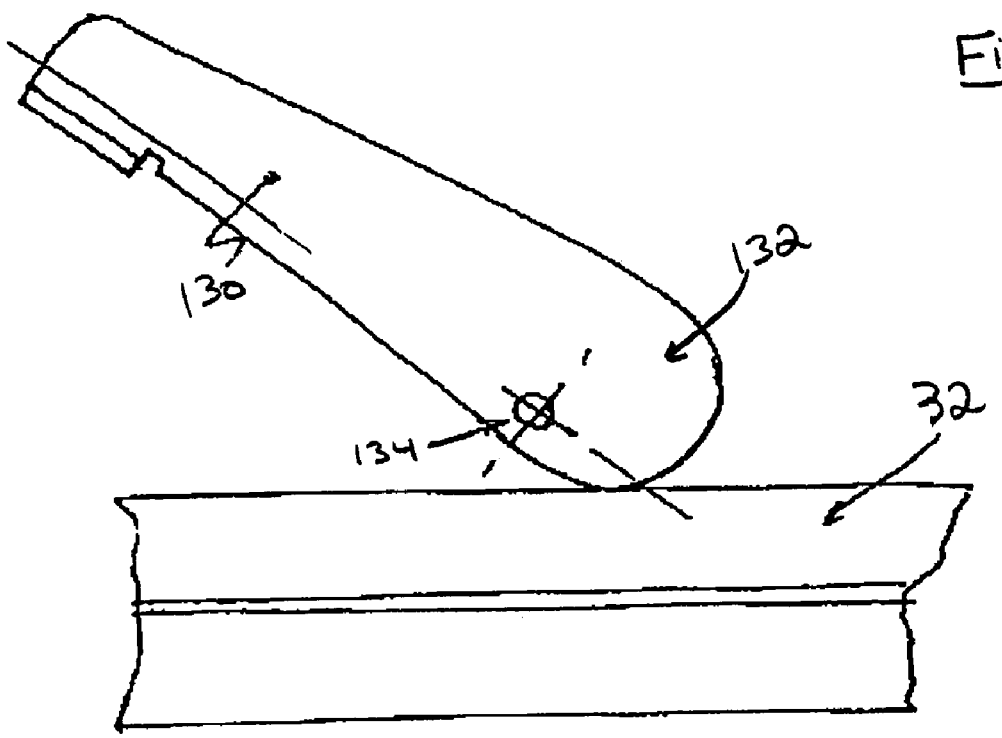
FIG. 5 shows a perspective view of an exemplary wireless communication device with mounting components in an unlocked position according to the present invention.
Figure 6:
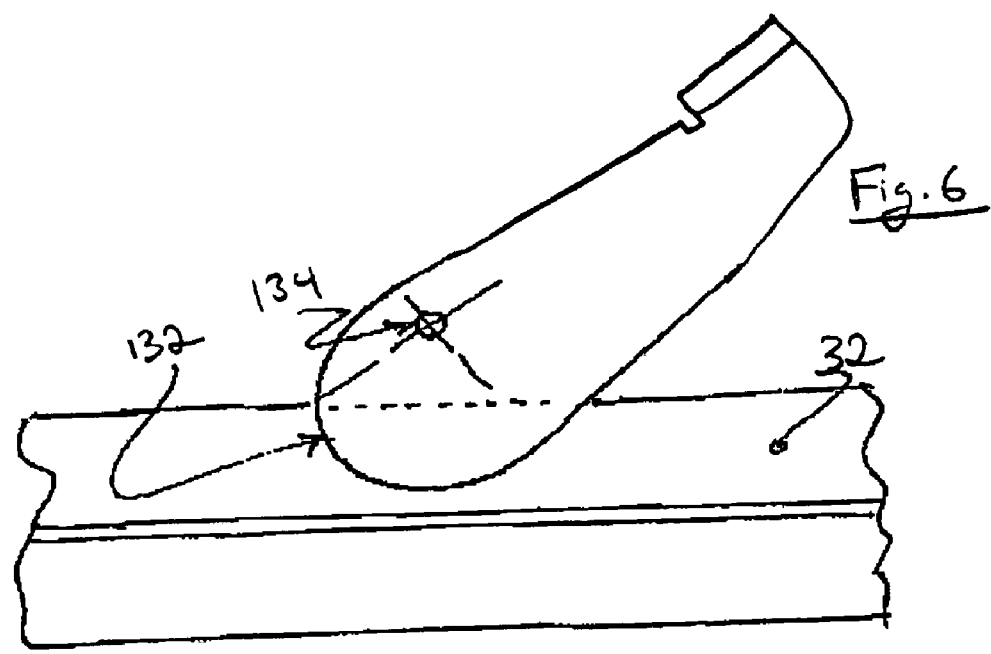
FIG. 6 shows a perspective view of an exemplary wireless communication device with mounting components in a locked position according to the present invention.

The latch 130 comprises a cam 132 rotatably mounted on the pivot 134. The latch 130 is rotated on the pivot 134 (e.g., a rivet, screw, bolt, etc.) between unlocked and locked positions for mounting the AP 10 to the T-bar 32. In an exemplary embodiment, the cam 132 is eccentric such that an axis of rotation of the cam 132 is offset from a geometric center thereof. Thus, when the latch 130 is in the unlocked position as shown in FIG. 5, a camming surface of the cam 132 is completely disengaged from the flange of the T-bar 32. The T-bar 32 may then be positioned in a receiving channel between the latch 130 and the clips 110 and 120. Rotation of the cam 32 into the locked position, shown in FIG. 6, engages the camming surface with the T-bar 32 and secures the T-bar 32 in the receiving channel. The receiving channel is more clearly shown in FIG. 4 between the pivot 134 and the clip 110.

Those of skill in the art will understand that mounting components may be attached to any surface of the AP 10. For example, if the T-bar 32 is located in a corner of a room or adjacent a wall, there may not be enough room to mount the AP 10 as shown in FIG. 3. Thus, a side surface of the AP 10, rather than a top/bottom surface as shown in FIG. 3, may be provided with the mounting components.

In an alternative exemplary embodiment, the mounting components may be included on a preformed mounting plate (not shown) which is coupleable to the AP 10. The clips 110, 120 and the latch 130 rest on a top surface of the mounting plate while a bottom surface of the mounting plate is coupled to the AP 10 via an attachment mechanism (e.g., mechanical or chemical). The attachment mechanism may include, for example, screws or bolts which secure the mounting plate to the AP 10. Those of skill in the art will understand that the attachment mechanism may, alternatively, include glue, Velcro®, snap-on buttons, clips, latches, etc. One advantage of using the detachable mounting plate is that the AP 10 may be removed or interchanged for another device while leaving the mounting plate affixed to the T-bar ceiling 30. Thus, the AP 10 may be detached from the ceiling 30 without uninstalling the mounting plate. This feature may be useful, for example, if the device needs only to be removed temporarily for servicing (e.g., repair, battery replacement/charging, etc.) or if a different device is desired at the same location.

Figure 7:
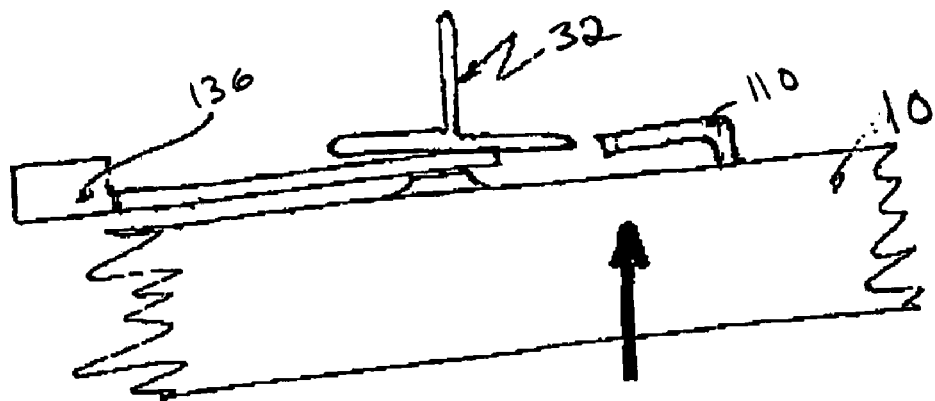
FIG. 7 shows a perspective view of an exemplary wireless communication device positioned for attachment to a T-bar.
Figure 8:
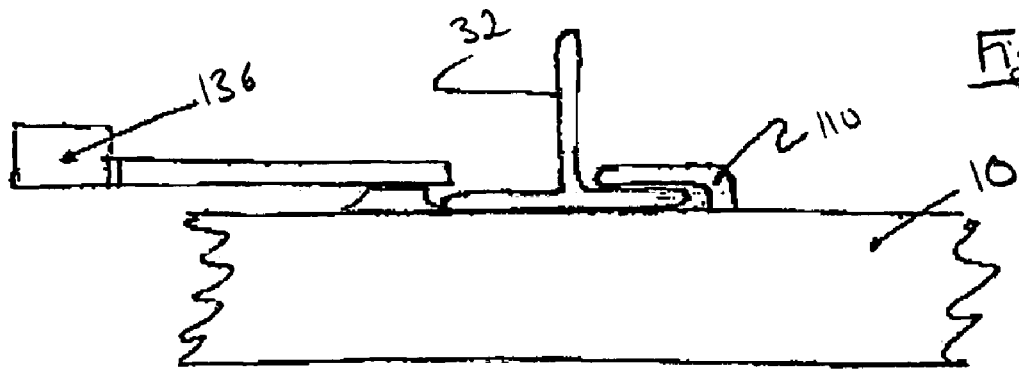
FIG. 8 shows a perspective view of an exemplary wireless communication device positioned for attachment to a T-bar.
Figure 9:
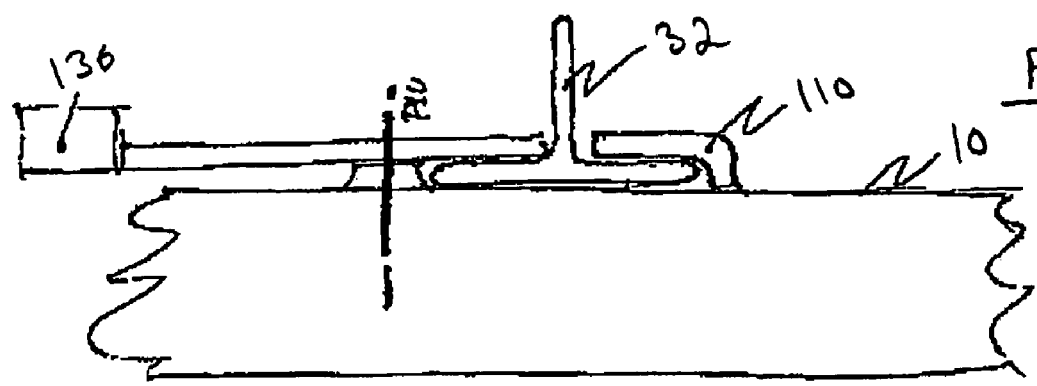
FIG. 9 shows a perspective view of an exemplary wireless communication device mounted to a T-bar.

FIGS. 7-9 depict an exemplary method of attaching the AP 10 to the T-bar 32 utilizing the mounting components of the present invention. Prior to installation, the ceiling tiles 34 adjacent to the T-bar 32 are removed or pushed upward providing access to the T-bar 32. The latch 130 is rotated to the unlocked position so that the cam 132 does not cover any portion of the receiving channel. The AP 10 may then be held at an angle relative to the T-bar 32, as shown in FIG. 7, and the T-bar 32 is positioned in the receiving channel. As shown in FIG. 8, the clips 110 and 120 engage the flange of the T-bar 32 when it is in the receiving channel. The installer may then visually confirm that the AP 10 is retained by the clips 110 and 120 before rotating the latch 130 into the locked position, as shown in FIG. 9, so that the camming surface of the cam 132 engages the flange of the T-bar 32 and covers the receiving channel. In one embodiment, the latch 130 is rotated until it is juxtaposed to the stem of the T-bar 32 allowing the ceiling tile 34 to be replaced on top of the T-bar 32 without interference from the latch 130.

The AP 10 may be removed by following the steps of the installation method in reverse order. That is, the ceiling tiles 34 are moved out of the way and the latch 130 is rotated into the unlocked position. The T-bar 32 may then be removed from the receiving channel.

Figure 10:
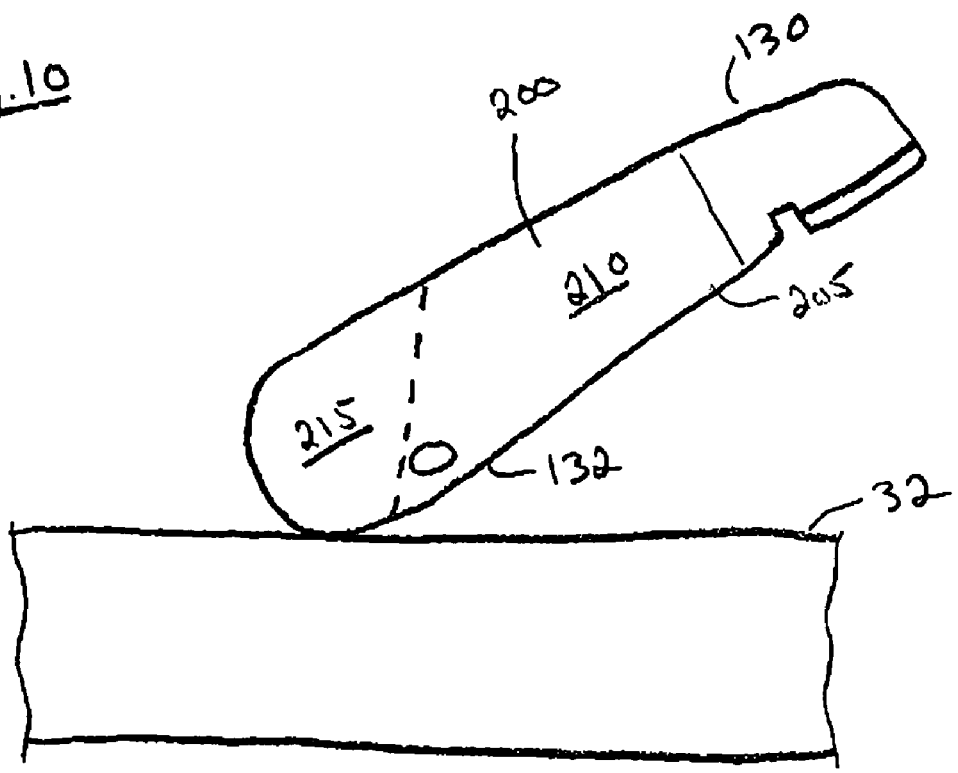
FIG. 10 shows a perspective view of an exemplary visual indicator of the mounting components of the present invention.
Figure 11:
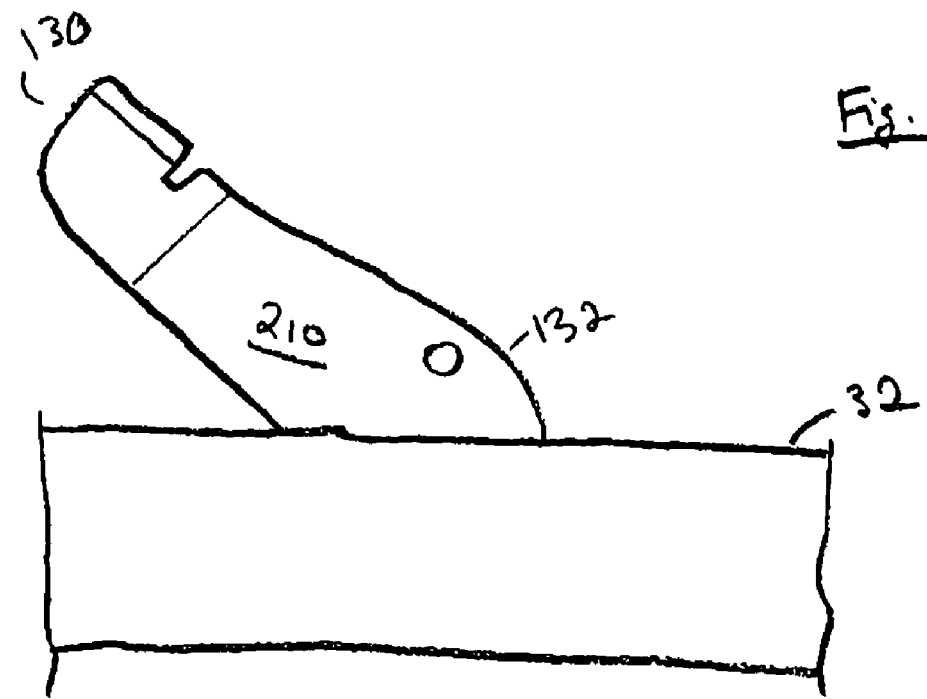
FIG. 11 shows a perspective view of an exemplary visual indicator of the mounting components of the present invention.

In another exemplary embodiment, the latch 130 includes a visual indicator 200, shown in FIGS. 10 and 11, indicating a position of the cam 132 relative to the T-bar 32. After installation, the latch 130 may be inadvertently rotated toward the unlocked position during, for example, cabling, construction, installing/removing light fixtures, etc. The visual indicator 200 includes, for example, a color strip 205 located on a side of the latch 130 visible from the floor with a first portion 210 of the color strip of a first color (e.g., green) and a second portion 215 of the color strip may be a second color (e.g., red). Thus, when only the first color is visible (FIG. 11), an observer knows that the latch 130 is in the locked position and does not need to be tightened. When the second color is visible (FIG. 10), an observer knows that the latch 130 has rotated to a predetermined angle with respect to the T-bar 32 (e.g., a position in which the latch 130 has rotated far enough from the T-bar 32 that the AP 10 may be loose and/or in danger of falling from the T-bar 32).

The present invention has been described with reference to the above exemplary embodiments. One skilled in the art will understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A ceiling mount for a device, comprising:
   a channel member including a side surface extending upward a first predetermined distance from a top surface of a housing of the device and a horizontal surface extending for a second predetermined distance away from the side surface in a direction substantially perpendicular to the side surface to define a first ceiling member receiving channel between the horizontal surface and the top surface; and
   a latch rotatably attached to the top surface, the latch defining a second ceiling member receiving channel between the latch and the top surface, so that when rotated, the latch covers the second ceiling member receiving channel,
   wherein the device is one of an access point, a switch, a router, a hub, a smoke alarm, a carbon monoxide detector and a speaker.

2. The mount of claim 1, further comprising:
   at least one further channel member including a further side surface extending upward a third predetermined distance from the top surface of the housing of the device and a further horizontal surface extending for a fourth predetermined distance away from the further side surface in a direction substantially perpendicular to the further side surface to define a third ceiling member receiving channel between the further horizontal surface and the top surface.

3. The mount of claim 2, wherein the channel member and the at least one further channel member are aligned along a longitudinal axis of the device and separated by a predetermined distance, the latch being positioned at a predetermined point within the distance.

4. The mount of claim 1, wherein the latch is a cam including a camming surface engaging a ceiling member in the second ceiling member receiving channel when the latch is rotated to a predetermined position.

5. The mount of claim 4, wherein the cam is mounted for eccentric rotation with the latch.

6. A mountable electronic assembly, comprising:
   a device; and
   a mounting bracket coupled to the device, the bracket including a channel member and a latch, the channel member including a side surface extending upward a first predetermined distance from a top surface of the bracket and a horizontal surface extending for a second predetermined distance away from the side surface in a direction substantially perpendicular to the side surface to define a first ceiling member receiving channel between the horizontal surface and the top surface, the latch rotatably attached to the top surface and defining a second ceiling member receiving channel between the latch and the top surface, so that when rotated, the latch covers the second ceiling member receiving channel,
   wherein the device is one of an access point, a switch, a router, a hub, a smoke alarm, a carbon monoxide detector and a speaker.

7. The assembly of claim 6, wherein the bracket further includes at least one further channel member including a further side surface extending upward a third predetermined distance from the top surface of the housing of the device and a further horizontal surface extending for a fourth predetermined distance away from the further side surface in a direction substantially perpendicular to the further side surface to define a third ceiling member receiving channel between the further horizontal surface and the top surface.

8. The assembly of claim 7, wherein the channel member and the at least one further channel member are aligned along a longitudinal axis of the device and separated by a predetermined distance, the latch being positioned between the channel member and the at least one further channel member.

9. The assembly of claim 6, wherein the latch is a cam including a camming surface engaging a ceiling member in the second ceiling member receiving channel when the latch is rotated to a predetermined position.

10. A ceiling mount, comprising:
    a channel member including a side surface extending upward a first predetermined distance from a top surface of the mount and a horizontal surface extending a second predetermined distance away from the side surface in a direction substantially perpendicular to the side surface to define a first ceiling member receiving channel between the horizontal surface and the top surface;
    a latch rotatably attached to the top surface, the latch defining a second ceiling member receiving channel between the latch and the top surface, so that when rotated, the latch covers the second ceiling member receiving channel; and
    an attachment mechanism securing a device to a bottom surface of the mount,
    wherein the device is one of an access point, a switch, a router, a hub, a smoke alarm, a carbon monoxide detector and a speaker.

11. The mount of claim 10, further comprising:
    at least one further channel member including a further side surface extending upward a third predetermined distance from the top surface and a further horizontal surface extending for a fourth predetermined distance away from the further side surface in a direction substantially perpendicular to the further side surface to define a third ceiling member receiving channel between the further horizontal surface and the top surface.

12. The mount of claim 11, wherein the channel member and the at least one further channel member are aligned along a longitudinal axis of the device and separated by a predetermined distance, the latch being positioned at a predetermined point within the distance.

13. The mount of claim 10, wherein the latch is a cam including a camming surface engaging a ceiling member in the second ceiling member receiving channel when the latch is rotated to a predetermined position.

14. The mount of claim 10, wherein the attachment mechanism includes at least one of screws, bolts, glue, hook and loop, buttons, clips and latches.

* * * * *

UNITED STATES PATENT AND TRADEMARK OFFICE
CERTIFICATE OF CORRECTION

| | | |
|---|---|---|
| PATENT NO. | : 7,621,497 B2 | Page 1 of 1 |
| APPLICATION NO. | : 11/267006 | |
| DATED | : November 24, 2009 | |
| INVENTOR(S) | : Wallace | |

It is certified that error appears in the above-identified patent and that said Letters Patent is hereby corrected as shown below:

ON THE TITLE PAGE

On the Face Page, item (22), under "Filed", in Column 1, Line 1, delete "Nov. 4, 2006" and insert -- Nov. 4, 2005 --, therefor.

Signed and Sealed this

Ninth Day of February, 2010

David J. Kappos
*Director of the United States Patent and Trademark Office*